(12) United States Patent
Smith et al.

(10) Patent No.: US 9,930,142 B2
(45) Date of Patent: Mar. 27, 2018

(54) SYSTEM FOR PROVIDING A CONTINUOUS COMMUNICATION LINK WITH A SYMBOL READING DEVICE

(71) Applicant: Hand Held Products, Inc., Fort Mill, SC (US)

(72) Inventors: Taylor Smith, Charlotte, NC (US); Mark Schmidt, Waxhaw, NC (US)

(73) Assignee: Hand Held Products, Inc., Fort Mill, SC (US)

( * ) Notice: Subject to any disclaimer, the term of this patent is extended or adjusted under 35 U.S.C. 154(b) by 108 days.

(21) Appl. No.: 13/902,242

(22) Filed: May 24, 2013

(65) Prior Publication Data

US 2014/0351317 A1 Nov. 27, 2014

(51) Int. Cl.
*G06F 15/16* (2006.01)
*H04L 29/06* (2006.01)
*G06K 7/10* (2006.01)
*G06K 17/00* (2006.01)

(52) U.S. Cl.
CPC .......... *H04L 67/42* (2013.01); *G06K 7/10881* (2013.01); *G06K 17/0022* (2013.01)

(58) Field of Classification Search
CPC .............. H04L 67/42; G06F 17/30879; G06K 7/10821; G06K 7/10881; G06K 17/0022
USPC ........................ 709/203, 217, 227
See application file for complete search history.

(56) References Cited

U.S. PATENT DOCUMENTS

| | | |
|---|---|---|
| 6,832,725 B2 | 12/2004 | Gardiner et al. |
| 7,128,266 B2 | 10/2006 | Marlton et al. |
| 7,159,783 B2 | 1/2007 | Walczyk et al. |
| 7,413,127 B2 | 8/2008 | Ehrhart et al. |
| 7,726,575 B2 | 6/2010 | Wang et al. |
| 8,294,969 B2 | 10/2012 | Plesko |
| 8,317,105 B2 | 11/2012 | Kotlarsky et al. |
| 8,322,622 B2 | 12/2012 | Suzhou et al. |
| 8,366,005 B2 | 2/2013 | Kotlarsky et al. |
| 8,371,507 B2 | 2/2013 | Haggerty et al. |
| 8,376,233 B2 | 2/2013 | Van Horn et al. |
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Horn et al. |

(Continued)

FOREIGN PATENT DOCUMENTS

| | | |
|---|---|---|
| WO | 2013163789 A1 | 11/2013 |
| WO | 2013173985 A1 | 11/2013 |
| WO | 2014019130 A1 | 2/2014 |

OTHER PUBLICATIONS

U.S. Pat. Appl. No. 13/367,978, filed Feb. 7, 2012, (Feng et al.); now abandoned.

(Continued)

*Primary Examiner* — Phuoc Nguyen

(74) *Attorney, Agent, or Firm* — Additon, Higgins & Pendleton, P.A.

(57) ABSTRACT

The disclosure embraces a system and method for providing a continuous communication link between a server computer and a symbol reading device, and a novel symbol reading device adapted for use in such a system. The system greatly simplifies the remote management, diagnostic evaluation, and monitoring of symbol reading devices, especially those devices connected to host devices that are not PC-based or running a complete operating system.

18 Claims, 4 Drawing Sheets

(56) References Cited

U.S. PATENT DOCUMENTS

| | | |
|---|---|---|
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 9,652,650 B2 * | 5/2017 | Pasik ............... G06K 7/14 |
| 2003/0209605 A1 * | 11/2003 | Walczyk et al. ......... 235/472.01 |
| 2005/0044172 A1 | 2/2005 | Philyaw |
| 2006/0006231 A1 | 1/2006 | Anson et al. |
| 2007/0063048 A1 | 3/2007 | Havens et al. |
| 2008/0035734 A1 | 2/2008 | Challa et al. |
| 2008/0093456 A1 | 4/2008 | Pasik et al. |
| 2008/0185432 A1 | 8/2008 | Caballero et al. |
| 2009/0134221 A1 | 5/2009 | Zhu et al. |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2011/0169999 A1 | 7/2011 | Grunow et al. |
| 2011/0202554 A1 | 8/2011 | Powilleit et al. |
| 2012/0111946 A1 | 5/2012 | Golant |
| 2012/0138685 A1 | 6/2012 | Qu et al. |
| 2012/0168511 A1 | 7/2012 | Kotlarsky et al. |
| 2012/0168512 A1 | 7/2012 | Kotlarsky et al. |
| 2012/0193407 A1 | 8/2012 | Barten |
| 2012/0193423 A1 | 8/2012 | Samek |
| 2012/0203647 A1 | 8/2012 | Smith |
| 2012/0223141 A1 | 9/2012 | Good et al. |
| 2012/0228382 A1 | 9/2012 | Havens et al. |
| 2012/0248188 A1 | 10/2012 | Kearney |
| 2013/0043312 A1 | 2/2013 | Van Horn |
| 2013/0056285 A1 | 3/2013 | Meagher |
| 2013/0070322 A1 | 3/2013 | Fritz et al. |
| 2013/0075168 A1 | 3/2013 | Amundsen et al. |
| 2013/0082104 A1 | 4/2013 | Kearney et al. |
| 2013/0175341 A1 | 7/2013 | Kearney et al. |
| 2013/0175343 A1 | 7/2013 | Good |
| 2013/0200158 A1 | 8/2013 | Feng et al. |
| 2013/0214048 A1 | 8/2013 | Wilz |
| 2013/0256418 A1 | 10/2013 | Havens et al. |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0278425 A1 | 10/2013 | Cunningham et al. |
| 2013/0287258 A1 | 10/2013 | Kearney |
| 2013/0292474 A1 | 11/2013 | Xian et al. |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306730 A1 | 11/2013 | Brady et al. |
| 2013/0306731 A1 | 11/2013 | Pedraro |
| 2013/0306734 A1 | 11/2013 | Xian et al. |
| 2013/0307964 A1 | 11/2013 | Bremer et al. |
| 2013/0308625 A1 | 11/2013 | Corcoran |
| 2013/0313324 A1 | 11/2013 | Koziol et al. |
| 2013/0313325 A1 | 11/2013 | Wilz et al. |
| 2013/0313326 A1 | 11/2013 | Ehrhart |
| 2013/0327834 A1 | 12/2013 | Hennick et al. |
| 2013/0341399 A1 | 12/2013 | Xian et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008430 A1 | 1/2014 | Soule et al. |
| 2014/0008439 A1 | 1/2014 | Wang |
| 2014/0019242 A1 * | 1/2014 | Reichert ............... G06Q 20/202 705/14.53 |
| 2014/0021256 A1 | 1/2014 | Qu et al. |
| 2014/0025584 A1 | 1/2014 | Liu et al. |
| 2014/0027518 A1 | 1/2014 | Edmonds et al. |
| 2014/0034723 A1 | 2/2014 | Van Horn et al. |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061305 A1 | 3/2014 | Nahill et al. |

(56) References Cited

U.S. PATENT DOCUMENTS

| | | |
|---|---|---|
| 2014/0061306 A1 | 3/2014 | Wu et al. |
| 2014/0061307 A1 | 3/2014 | Wang et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0075846 A1 | 3/2014 | Woodburn |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0084068 A1 | 3/2014 | Gillet et al. |
| 2014/0086348 A1 | 3/2014 | Peake et al. |
| 2014/0097249 A1 | 4/2014 | Gomez et al. |
| 2014/0098284 A1 | 4/2014 | Oberpriller et al. |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Li et al. |
| 2014/0104451 A1 | 4/2014 | Todeschini et al. |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0121438 A1 | 5/2014 | Kearney |
| 2014/0121445 A1 | 5/2014 | Ding et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131441 A1 | 5/2014 | Nahill et al. |
| 2014/0133379 A1 | 5/2014 | Wang et al. |
| 2014/0140585 A1 | 5/2014 | Wang |
| 2014/0151453 A1 | 6/2014 | Meier et al. |
| 2014/0160329 A1 | 6/2014 | Ren et al. |

OTHER PUBLICATIONS

U.S. Appl. No. 13/736,139 for an Electronic Device Enclosure, filed Jan. 8, 2013 (Chaney); 40 pages.
U.S. Appl. No. 13/771,508 for an Optical Redirection Adapter, filed Feb. 20, 2013 (Anderson); 26 pages.
U.S. Appl. No. 13/780,356 for a Mobile Device Having Object Identification Interface, filed Feb. 28, 2013 (Samek et al.); 21 pages.
U.S. Appl. No. 13/852,097 for a System and Method for Capturing and Preserving Vehicle Event Data, filed Mar. 28, 2013 (Barker et al.); 20 pages.
U.S. Appl. No. 13/902,110 for a System and Method for Display of Information Using a Vehicle-Mount Computer, filed May 24, 2013 (Hollifield); 29 pages.
U.S. Appl. No. 13/902,144, for a System and Method for Display of Information Using a Vehicle-Mount Computer, filed May 24, 2013 (Chamberlin); 23 pages.
U.S. Appl. No. 13/902,242 for a System for Providing a Continuous Communication Link With a Symbol Reading Device, filed May 24, 2013 (Smith et al.); 24 pages.
U.S. Appl. No. 13/912,262 for a Method of Error Correction for 3D Imaging Device, filed Jun. 7, 2013 (Jovanovski et al.); 33 pages.
U.S. Appl. No. 13/912,702 for a System and Method for Reading Code Symbols at Long Range Using Source Power Control, filed Jun. 7, 2013 (Xian et al.); 24 pages.

U.S. Appl. No. 13/922,339 for a System and Method for Reading Code Symbols Using a Variable Field of View, filed Jun. 20, 2013 (Xian et al.); 23 pages.
U.S. Appl. No. 13/927,398 for a Code Symbol Reading System Having Adaptive Autofocus, filed Jun. 26, 2013 (Todeschini); 24 pages.
U.S. Appl. No. 13/930,913 for a Mobile Device Having an Improved User Interface for Reading Code Symbols, filed Jun. 28, 2013 (Gelay et al.); 24 pages.
U.S. Appl. No. 13/933,415 for an Electronic Device Case, filed Jul. 2, 2013 (London et al.); 47 pages.
U.S. Appl. No. 13/947,296 for a System and Method for Selectively Reading Code Symbols, filed Jul. 22, 2013 (Rueblinger et al.); 29 pages.
U.S. Appl. No. 13/950,544 for a Code Symbol Reading System Having Adjustable Object Detection, filed Jul. 25, 2013 (Jiang); 28 pages.
U.S. Appl. No. 13/961,408 for a Method for Manufacturing Laser Scanners, filed Aug. 7, 2013 (Saber et al.); 26 pages.
U.S. Appl. No. 14/018,729 for a Method for Operating a Laser Scanner, filed Sep. 5, 2013 (Feng et al.); 24 pages.
U.S. Appl. No. 14/019,616 for a Device Having Light Source to Reduce Surface Pathogens, filed Sep. 6, 2013 (Todeschini); 23 pages.
U.S. Appl. No. 14/023,762 for a Handheld Indicia Reader Having Locking Endcap, filed Sep. 11, 2013 (Gannon); 31 pages.
U.S. Appl. No. 14/035,474 for Augmented-Reality Signature Capture, filed Sep. 24, 2013 (Todeschini); 33 pages.
U.S. Appl. No. 14/047,896 for Terminal Having Illumination and Exposure Control filed Oct. 7, 2013 (Jovanovski et al.); 32 pages.
U.S. Appl. No. 14/053,175 for Imaging Apparatus Having Imaging Assembly, filed Oct. 14, 2013 (Barber); 39 pages.
U.S. Appl. No. 14/055,234 for Dimensioning System, filed Oct. 16, 2013 (Fletcher); 26 pages.
U.S. Appl. No. 14/053,314 for Indicia Reader, filed Oct. 14, 2013 (Huck); 29 pages.
U.S. Appl. No. 14/065,768 for Hybrid System and Method for Reading Indicia, filed Oct. 29, 2013 (Meier et al.); 22 pages.
U.S. Appl. No. 14/074,746 for Self-Checkout Shopping System, filed Nov. 8, 2013 (Hejl et al.); 26 pages.
U.S. Appl. No. 14/074,787 for Method and System for Configuring Mobile Devices via NFC Technology, filed Nov. 8, 2013 (Smith et al.); 28 pages.
U.S. Appl. No. 14/087,190 for Optimal Range Indicators for Bar Code Validation, filed Nov. 22, 2013 (Hejl); 27 pages.
U.S. Appl. No. 14/345,735 for Optical Indicia Reading Terminal with Combined Illumination filed Mar. 19, 2014 (Ouyang); 19 pages.
U.S. Appl. No. 14/101,965 for High Dynamic-Range Indicia Reading System, filed Dec. 10, 2013 (Xian); 28 pages.
U.S. Appl. No. 14/118,400 for Indicia Decoding Device with Security Lock, filed Nov. 18, 2013 (Liu); 28 pages.
U.S. Appl. No. 14/150,393 for Incicia-reader Having Unitary Construction Scanner, filed Jan. 8, 2014 (Colavito et al.); 28 pages.
U.S. Appl. No. 14/154,207 for Laser Barcode Scanner, filed Jan. 14, 2014 (Hou et al.); 26 pages.
U.S. Appl. No. 14/154,915 for Laser Scanning Module Employing a Laser Scanning Assembly having Elastomeric Wheel Hinges, filed Jan. 14, 2014 (Havens et al.); 24 pages.
U.S. Appl. No. 14/158,126 for Methods and Apparatus to Change a Feature Set on Data Collection Devices, filed Jan. 17, 2014 (Berthiaume et al.); 53 pages.
U.S. Appl. No. 14/342,551 for Terminal Having Image Data Format Conversion filed Mar. 4, 2014 (Lui et al.); 25 pages.
U.S. Appl. No. 14/342,544 for Imaging Based Barcode Scanner Engine with Multiple Elements Supported on a Common Printed Circuit Board filed Mar. 4, 2014 (Liu et al.); 27 pages.
U.S. Appl. No. 14/257,174 for Reading Apparatus Having Partial Frame Operating Mode filed Apr. 21, 2014, (Barber et al.), 67 pages.
U.S. Appl. No. 14/200,405 for Indicia Reader for Size-Limited Applications filed Mar. 7, 2014 (Feng et al.); 42 pages.
U.S. Appl. No. 14/166,103 for Indicia Reading Terminal Including Optical Filter filed Jan. 28, 2014 (Lu et al.); 29 pages.

(56) References Cited

OTHER PUBLICATIONS

Extended European Search and Opinion Report for Application No. 14167806.0, dated Nov. 17, 2014, 8 pages.
Exam Report in related EP Application 14167806.0, dated Nov. 30, 2015, 5 pages.
U.S. Appl. No. 14/274,858 for Mobile Printer With Optional Battery Accessory, filed May 12, 2014, (Marty et al.), 26 pages.
U.S. Appl. No. 14/264,173 for Autofocus Lens System for Indicia Readers filed Apr. 29, 2014, (Ackley et al.), 39 pages.
U.S. Appl. No. 14/230,322 for Focus Module and Components with Actuator filed Mar. 31, 2014 (Feng et al.); 92 pages.
U.S. Appl. No. 14/222,994 for Method and Apparatus for Reading Optical Indicia Using a Plurality of Data filed Mar. 24, 2014 (Smith et al.); 30 pages.
U.S. Appl. No. 14/231,898 for Hand-Mounted Indicia-Reading Device with Finger Motion Triggering filed Apr. 1, 2014 (Van Horn et al.); 36 pages.
U.S. Appl. No. 29/486,759 for an Imaging Terminal, filed Apr. 2, 2014 (Oberpriller et al.); 8 pages.
U.S. Appl. No. 29/436,337 for an Electronic Device, filed Nov. 5, 2012 (Fitch et al.); 19 pages.
U.S. Appl. No. 29/458,405 for an Electronic Device, filed Jun. 19, 2013 (Fitch et al.); 22 pages.
U.S. Appl. No. 29/459,620 for an Electronic Device Enclosure, filed Jul. 2, 2013 (London et al.); 21 pages.
U.S. Appl. No. 29/459,681 for an Electronic Device Enclosure, filed Jul. 2, 2013 (Chaney et al.); 14 pages.
U.S. Appl. No. 29/459,785 for a Scanner and Charging Base, filed Jul. 3, 2013 (Fitch et al.); 21 pages.
U.S. Appl. No. 29/459,823 for a Scanner, filed Jul. 3, 2013 (Zhou et al.); 13 pages.
U.S. Appl. No. 29/468,118 for an Electronic Device Case, filed Sep. 26, 2013 (Oberpriller et al.); 44 pages.

\* cited by examiner

SYSTEM FOR PROVIDING A CONTINUOUS COMMUNICATION LINK WITH A SYMBOL READING DEVICE

BACKGROUND

Field of Disclosure

The present disclosure generally relates to information systems. More particularly, the present disclosure relates to a system for providing a continuous communication link with a symbol reading device, and a symbol reading device adapted for use in such a system.

Brief Overview of the State of the Art

A symbol reading device (e.g., barcode scanner, barcode reader, RFID reader) is a specialized input, device for certain data systems commonly used by retailers, industrial businesses, and other businesses having a need to manage large amounts of inventory. Symbol reading devices are often employed to read barcodes. A barcode is a machine-readable representation of information in a graphic format. The most familiar of these graphic symbols is a series of parallel bars and spaces of varying widths, which format gave rise to the term "barcode." The adoption of the Universal Product Code (UPC) version of barcode technology in 1973 quickly led to a revolution in logistics by obviating the need for manual entry of long number strings.

Most barcode scanners operate by projecting light from an LED or a laser onto the printed barcode, and then detecting the level of reflected light as the light beam sweeps across the barcode. Using this technique, the barcode scanner is able to distinguish between dark areas and light areas on the barcode. The barcode scanner can determine the width of each bar or white space and then decode the symbol to determine the represented data.

Although the basic concept behind barcode scanning technology has remained constant, the techniques employed continue to evolve. Recent trends include the widespread use of 2D barcodes (i.e., matrix codes), which provide for the representation of data in two dimensions. The QR Code is an example of a 2D barcode in wide use today, especially in the area of interactive marketing.

Typically, the barcode scanner transmits the data that it decodes from reading the barcode to a host device, which host device is configured to process the data in some useful way. In the retail context, where the barcode scanner is used in conjunction with the sale of products to the consumer, these host devices and their accompanying barcode scanners are often referred to as point-of-sale (POS) systems. The most ubiquitous example of the point-of-sale system is the checkout register at a supermarket, where an omni-directional barcode scanner reads the UPC code on grocery purchases. The barcode scanner passes the UPC code associated with each product along to the cash register, which then looks up the price associated with each product code. The communication link between the barcode scanner and the host device is often either an RS-232 serial connection or a universal serial bus (USE) connection.

The useful life of barcode scanners can be extended and functionality enhanced by updating the barcode scanner's software (e.g., firmware). In situations where the host device features a full-featured operating system capable of running software (e.g., Microsoft WINDOWS®) adapted to update the barcode scanner's firmware, a system administrator can update the firmware via the host device, either directly or through a network connection to the host device. Many host systems are not capable of directly supporting an upgrade of the barcode scanner firmware. Low-end retail host devices, such as certain electronic cash registers, may not be PC-based or may not be running complete operating systems. In addition, certain factors may prohibit a business from providing a network connection to certain host devices, making it impossible to remotely upgrade the barcode scanner firmware. Because these host devices cannot provide the necessary interface to upgrade the barcode scanner firmware, when performing system maintenance, it is necessary to disconnect the barcode scanner from the host device and then reconnect the barcode scanner to a suitable upgrade system, such as a PC-based laptop computer. Once the upgrade of the firmware is complete, the upgrade system is disconnected and the communication link between the barcode scanner and the host device is re-established.

The problem with this approach to upgrading a barcode scanner's firmware is that it is time-consuming, labor intensive, and results in the point-of-sale system, for example, being offline for the duration of the upgrade process. In environments employing many host device-barcode scanner pairings, the costs and delays brought about by this labor-intensive upgrade technique can be quite burdensome on a business.

What is needed is a system for providing communication to a symbol reading device, such as a barcode reader, that allows continuous access to the symbol reading device through a server computer even in situations where the host device is incapable of providing access to the symbol reading device for purposes of upgrading the symbol reading device's firmware. A system that provided an additional means of communicating with the symbol reading device beyond the communication link with the host device would not only allow for remote upgrading of the symbol reading device's firmware, but would allow for the transfer of data from the symbol reading device to systems other than the host device for additional data processing or data collection purposes.

OBJECTS OF PRESENT DISCLOSURE

A primary object of the present disclosure is to provide a system for providing a continuous communication link with a symbol reading device.

Another object of the present disclosure is to provide a system for providing a continuous communication link with a symbol reading device wherein a continuous communication link exists between the symbol reading device and a server computer and a continuous communication link exists between the symbol reading device and the host device.

Another object of the present disclosure is to provide a system for providing a continuous communication link with a symbol reading device wherein the symbol reading device has a communications module having a first interface for communicating with a host device and a second interface for communicating with a server computer.

Another object of the present disclosure is to provide a system for providing a continuous communication link with a symbol reading device wherein the symbol reading device's firmware may be updated without the need for disconnecting the symbol reading device from the host device even in situations where the host device is not suitable for providing access to the symbol reading device for the purpose of upgrading the firmware.

Another object of the present disclosure is to provide a system for providing a continuous communication link with a symbol reading device that allows for the upgrading of the symbol reading device's firmware with a reduced amount of time, labor and downtime when compared with conventional upgrade techniques.

Another object of the present disclosure is to provide a symbol reading device having the capability of separately communicating with a host device and a server computer.

Another object of the present disclosure is to provide a system whereby a server computer can collect data from a symbol reading device while the symbol reading device remains in continuous communication with a host device.

Further objects of the present disclosure will become more apparently understood hereinafter and in the claims appended hereto.

BRIEF DESCRIPTION OF THE DRAWINGS

To more fully understand the objects, the following detailed description of the illustrative embodiments should be read in conjunction with the accompanying drawings, wherein.

DETAILED DESCRIPTION OF THE ILLUSTRATIVE EMBODIMENTS

Figure 1:
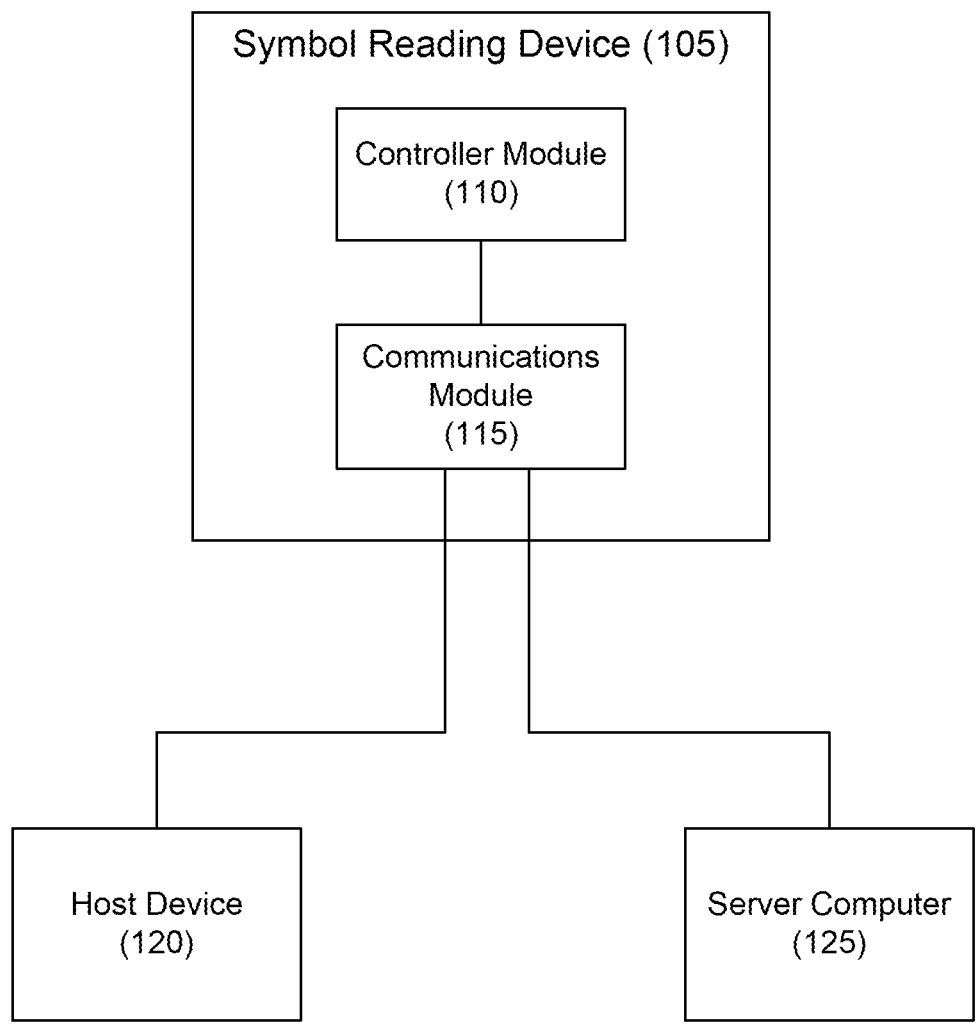
FIG. 1 is a schematic block diagram of an exemplary system for providing a continuous communication link with a symbol reading device according to the present disclosure.

Referring to the figures in the accompanying drawings, the illustrative embodiments of the system for providing a continuous communication link with a symbol reading device, and the symbol reading device according to the present disclosure will be described in great detail, wherein like elements will be indicated using like reference numerals.

It will be understood that the system for providing a continuous communication link with a symbol reading device of the illustrative embodiments may be modified in a variety of ways which will become readily apparent to those skilled in the art having the benefit of the novel teachings disclosed herein. All such modifications and variations of the illustrative embodiments thereof shall be deemed to be within the scope of the claims appended hereto.

In one aspect, the present disclosure embraces a system for providing a continuous communication link with a symbol reading device. The system includes a symbol reading device having a controller module. The system also includes a communications module in communication with the controller module of the symbol reading device. The system further includes a host device in communication with the communications module and a server computer in communication with the communications module.

In another aspect, the present disclosure embraces a symbol reading device. The symbol reading device according to the present disclosure includes a controller module for converting a symbol into data; a communications module for transmitting data, the communications module in communication with the controller module; wherein the communications module has a first interface for communicating with a host device and a second interface for communicating with a server computer.

Referring now to FIG. 1, the system 100 includes a symbol reading device 105. It will be understood that the symbol reading device may be any one of the various types of device intended for reading (e.g., decoding, interpreting) symbols (e.g., barcodes, RFID tags). Such symbol reading device 105 may be a pen-type barcode reader (e.g., wand barcode reader), laser barcode scanners, CCD barcode readers, camera-based barcode readers, omni-directional barcode scanners, RFID readers, or any similar device. It will be further understood that the term "barcode" is intended to broadly encompass insignia used to represent data, including various types of linear barcodes (i.e., 1D barcodes) and matrix barcodes (i.e., 2D barcodes). The symbol reading device 105 includes a controller module 110 that decodes the symbol, for example by converting readings of light reflected off a barcode into data (e.g., a product identification number, a shipment number, an account number, etc.).

The system 100 also includes a communications module 115. The communications module 115 is in communication with the controller module 110 by means suitable for allowing data to be transmitted from the controller module 110 to the communications module 115. Typically, the communications module 115 will be integral with the symbol reading device. The communications module 115 is adapted to communicate with a host device 120. It will be understood that the term "host device" is intended to broadly encompass the great variety of devices adapted to communicate with a symbol reading device 105. Examples of such host devices include, without limitation, electronic cash registers, inventory management systems, and inventory control systems. Typically, the communications module 115 is connected to the host device 120 via an RS-232 serial connection or a universal serial bus (USB) connection. The communications module 115 may be communicatively connected to the host device 120 in other ways, including by a wireless communication link (e.g., wireless radio (e.g., ZIGBEE, BLUETOOTH, WI-FI) and infrared transmissions).

The system 100 also includes a server computer 125. The server computer 125 is in communication with the communications module 115. The term server computer 125 is intended to be used broadly to encompass any computer or network of computers capable of running a software application adapted to upload information (e.g., updates to firmware) to the symbol reading device 105, and/or adapted to process information received from the symbol reading device 105. The communication link between the server computer 125 and the symbol reading device 105 may be established by various means, including by wired and wireless connections. This communication link between the server computer 125 and the symbol reading device 105 provides access to the scanning device 105 without the need to interrupt the communication link between the symbol reading device 105 and the host device 120. It will be understood that references in the disclosure to a continuous communication link are intended to indicate the existence of a continuing physical connection (e.g., wired or wireless connection) enabling communication (e.g., enabling the exchange of information on an as-needed basis). Such references are not intended to suggest that the system requires information to be communicated among system components at all times. Indeed, one of the advantages of the system 100 is that it allows for communication between the server computer 125 and the symbol reading device 105 as frequently or as infrequently as may be needed.

Figure 2:
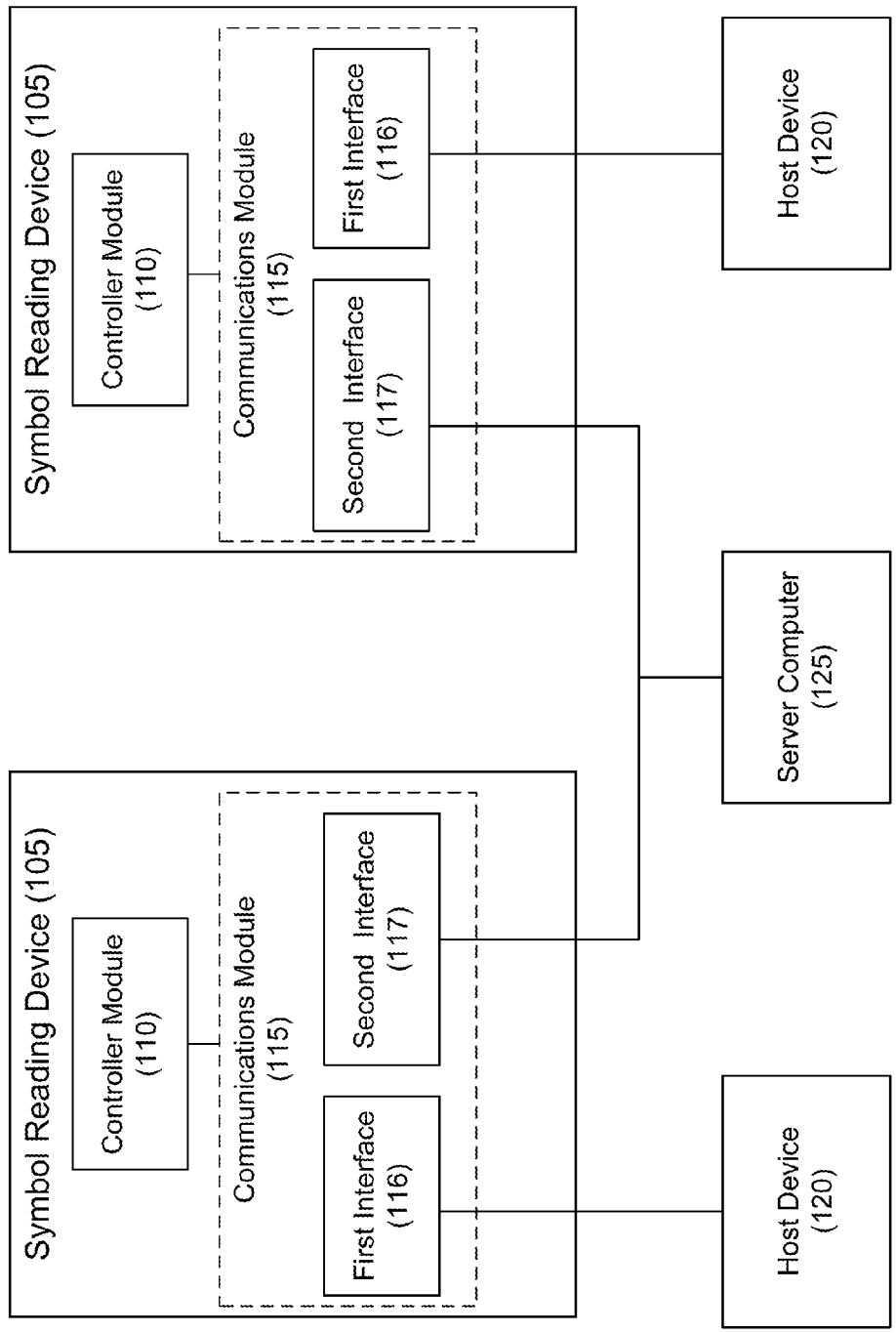
FIG. 2 is a schematic block diagram of an exemplary system for providing a continuous communication link with a symbol reading device according to the present disclosure.

As illustrated in FIG. 2, in one embodiment, the communications module 115 comprises a first interface 116 for communicating with the host device 120 and a second interface 117 for communicating with the server computer 125. The first interface 116 may be a separate component from the second interface 117 or it may be integral with the second interface 117. Typically, the first interface 116 is an RS-232 serial interface or a USB interface. Alternatively, the first interface 116 may be a wireless interface of the type that is well-known to a person of ordinary skill in the art.

The communication link between the symbol reading device 105 and the server computer 125 may be wired or wireless. Accordingly, the second interface 117 may comprise a wired technology interface (e.g., cabled Ethernet) or a wireless technology interface. A wireless connection may be advantageous in circumstances where running cable from the scanning device would be difficult or overly costly due to the nature of the building infrastructure or the distances involved, or when the use of cabling would inhibit the use of the symbol reading device 105 (e.g., when using a handheld device). For example, the second interface 117 may comprise a wireless personal area network interface (e.g., a BLUETOOTH interface or a ZIGBEE interface) allowing the symbol reading device 105 to communicate with the server computer 125 via a radio connection using a BLUETOOTH or ZIGBEE standard. A BLUETOOTH connection may also be advantageous because that standard allows for peer-to-peer connections between multiple devices in the personal area network. In this way, multiple symbol reading devices 105 could be wirelessly linked in a personal area network that is in communication with the system 100 through a master device. Alternatively, the second interface 117 may comprise a wireless local area network interface (WLAN) (e.g., WI-FI or 802.11x interface) or a wireless wide area network interface (WWAN) (e.g., GSM, CDMA, GPAS). It will be appreciated by one of ordinary skill in the art that symbol reading devices 105 connected to a server computer 125 using any of these techniques will be accessible by the server computer 125 and any computer (e.g., client computer) networked to the server computer 125. If the server computer 125 is connected to the Internet, then the symbol reading device may be assigned an Internet Protocol (IP) address, making it a uniquely identifiable node on the network. Therefore, the symbol reading device 105 can be remotely accessed by any other authorized computer on the network via the server computer 125. It will be appreciated that those systems 100 that incorporate many (e.g., hundreds) individual symbol reading devices 105 will particularly benefit from the remote access via a server computer 125, which remote access allows for much faster updating of these symbol reading devices 105 via the network than the traditional technique requiring the symbol reading device 105 to be disconnected from the host device 120 before any updating of the firmware can commence.

As depicted in FIG. 2, in one embodiment the communication link between the first interface 116 and the host device 120 is parallel to the communication link between the second interface 117 and the server computer 125. In this configuration the system 100 allows the symbol reading device 105 to transmit one set of data to the host device 120 and another set of data to the server computer 125. For example, the communication link to the host device 120 might typically carry only decoded barcode data transmissions, whereas the communication link to the server computer 120 might carry other types of data, including number of trigger pulls, time to decode, barcode quality or images of scanned barcodes.

Figure 3:
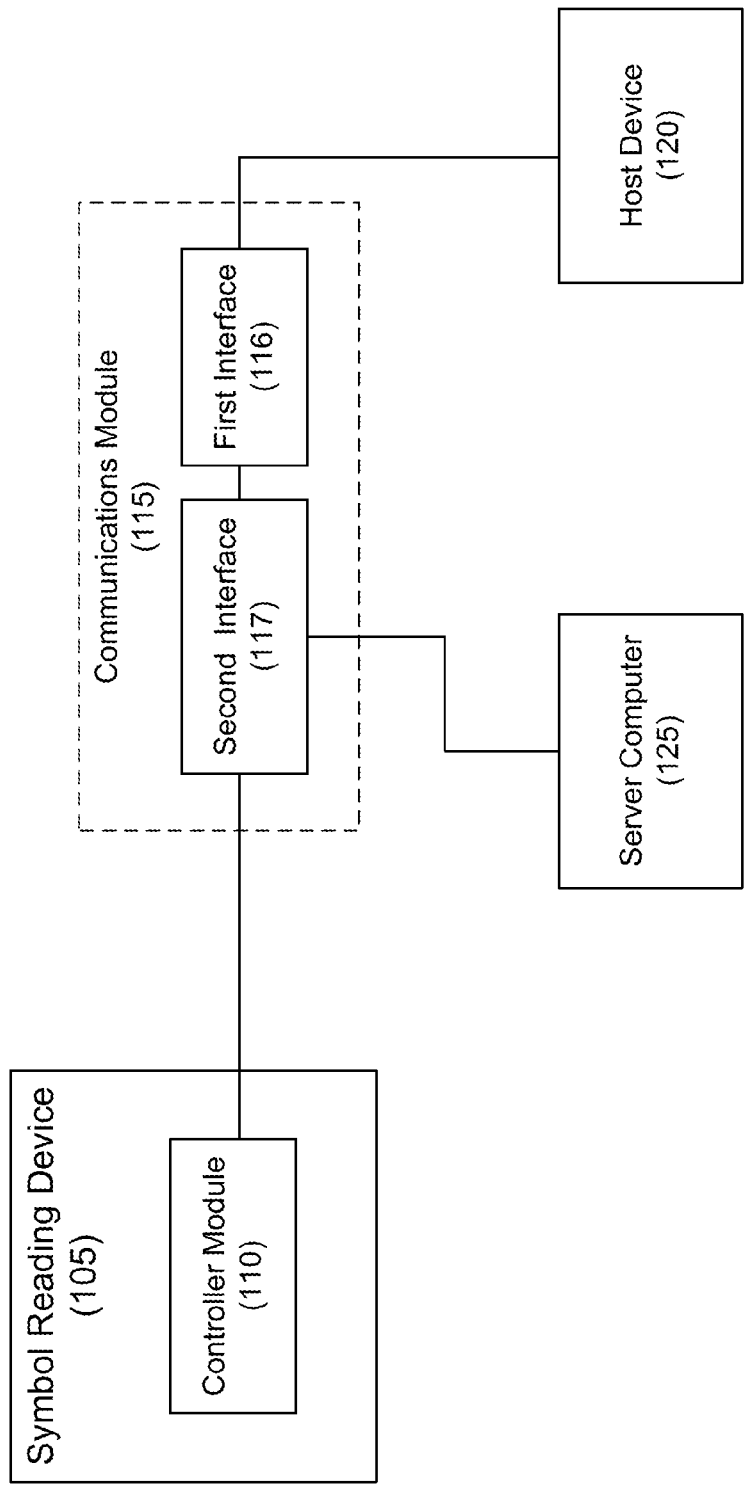
FIG. 3 is a schematic block diagram of an exemplary system for providing a continuous communication link with a symbol reading device according to the present disclosure.

FIG. 3 depicts an alternative configuration of the system 100 according to the present disclosure. In this configuration, the first interface 116 and the second interface 117 are connected in a serial fashion to the controller module (i.e., the second interface 117 and the second interface 117 are in shared communication with the controller module 110). In this configuration, the second interface 117 receives data from the controller module 110 and either transmits the data to the server computer 125 or passes the data through to the first interface 116 to be transmitted to the host device 120, or does both. This configuration might be advantageous in a system 100 where there is a cabled connection (e.g., RS-232 connection) between the symbol reading device 105 and the host device 120, and the second interface 117 is a wireless radio interface positioned within the cabling (e.g., a wireless radio pod incorporated into the cabling) connecting the symbol reading device 105 and the host device 120.

Figure 4:
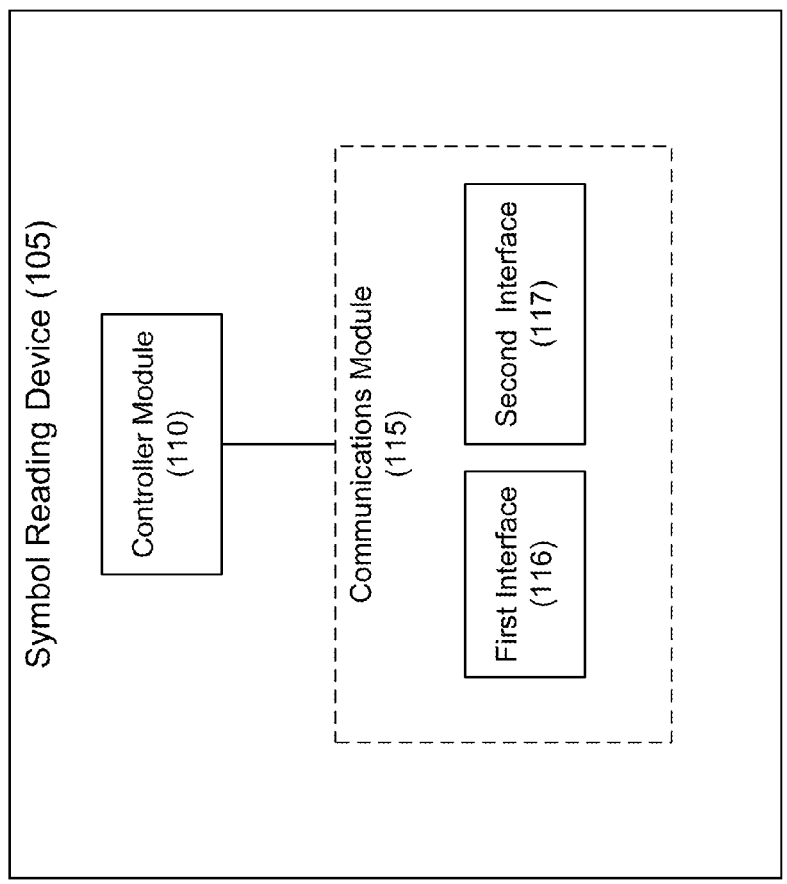
FIG. 4 is a schematic block diagram of an exemplary symbol reading device according to the present disclosure.

Turning now to FIG. 4, the disclosure alternatively embraces a symbol reading device 105 adapted for use with the system 100 according to the present disclosure. The symbol reading device 105 includes a controller module 110 for converting a symbol into data. The symbol reading device 105 also includes a communications module 115 for transmitting data. The communications module 115 is in communication with the controller module 110. The communication module 115 comprises a first interface 116 for communicating with a host device and a second interface 117 for communicating with a server computer 125. The second interface 117 may be wired (e.g., Ethernet network interface) or wireless (e.g., wireless personal area network interface, wireless local area network interface, or wireless wide area network interface).

* * *

To supplement the present disclosure, this application incorporates entirely by reference the following patents, patent application publications, and patent applications: U.S. Pat. Nos. 6,832,725; 7,159,783; 7,413,127; 8,390,909; 8,294,969; 8,408,469; 8,408,468; 8,381,979; 8,408,464; 8,317,105; 8,366,005; 8,424,768; 8,322,622; 8,371,507; 8,376,233; 8,457,013; 8,448,863; U.S. Patent Application Publication No. 2012/0111946; U.S. Patent Application Publication No. 2012/0223141; U.S. Patent Application Publication No. 2012/0193423; U.S. Patent Application Publication No. 2012/0203647; U.S. Patent Application Publication No. 2012/0248188; U.S. Patent Application Publication No. 2012/0228382; U.S. Patent Application Publication No. 2012/0193407; U.S. Patent Application Publication No. 2012/0168511; U.S. Patent Application Publication No. 2012/0168512; U.S. Patent Application Publication No. 2010/0177749; U.S. Patent Application Publication No. 2010/0177080; U.S. Patent Application Publication No. 2010/0177707; U.S. Patent Application Publication No. 2010/0177076; U.S. Patent Application Publication No. 2009/0134221; U.S. Patent Application Publication No. 2012/0318869; U.S. Patent Application Publication No. 2013/0043312; U.S. Patent Application Publication No. 2013/0068840; U.S. Patent Application Publication No. 2013/0070322; U.S. Patent Application Publication No. 2013/0075168; U.S. Patent Application Publication No. 2013/0056285; U.S. Patent Application Publication No. 2013/0075464; U.S. Patent Application Publication No. 2013/0082104; U.S. Patent Application Publication No. 2010/0225757; U.S. patent application Ser. No. 13/347,219 for an OMNIDIRECTIONAL LASER SCANNING BAR CODE SYMBOL READER GENERATING A LASER SCANNING PATTERN WITH A HIGHLY NON-UNIFORM SCAN DENSITY WITH RESPECT TO LINE ORIENTATION, filed Jan. 10, 2012 (Good); U.S. patent application Ser. No. 13/347,193 for a HYBRID-TYPE BIOPTICAL LASER SCANNING AND DIGITAL IMAGING SYSTEM EMPLOYING DIGITAL IMAGER WITH FIELD OF VIEW OVERLAPPING FIELD OF FIELD OF LASER SCANNING SUBSYSTEM, filed Jan. 10, 2012 (Kearney et al.); U.S. patent application Ser. No. 13/367,047 for LASER SCANNING MODULES EMBODYING SILICONE SCAN ELEMENT WITH TORSIONAL HINGES, filed Feb. 6, 2012 (Feng et al.); U.S. patent application Ser. No. 13/400,748 for a LASER SCANNING BAR CODE SYMBOL READING SYSTEM HAVING INTELLIGENT SCAN SWEEP ANGLE ADJUSTMENT CAPABILITIES OVER THE WORKING RANGE OF THE SYSTEM FOR OPTIMIZED BAR CODE SYMBOL READING PERFORMANCE, filed Feb. 21, 2012 (Wilz); U.S. patent application Ser. No. 13/432,197 for a LASER SCANNING SYSTEM USING LASER BEAM SOURCES FOR PRODUCING LONG AND SHORT WAVELENGTHS IN COMBINATION WITH BEAM-WAIST EXTENDING OPTICS TO EXTEND THE DEPTH OF FIELD THEREOF WHILE RESOLVING HIGH RESOLUTION BAR CODE SYMBOLS HAVING MINIMUM CODE ELEMENT WIDTHS, filed Mar. 28, 2012 (Havens et al.); U.S. patent application Ser. No. 13/492,883 for a LASER SCANNING MODULE WITH ROTATABLY ADJUSTABLE LASER SCANNING ASSEMBLY, filed Jun. 10, 2012 (Hennick et al.); U.S. patent application Ser. No. 13/367,978 for a LASER SCANNING MODULE EMPLOYING AN ELASTOMERIC U-HINGE BASED LASER SCANNING ASSEMBLY, filed Feb. 7, 2012 (Feng et al.); U.S. patent application Ser. No. 13/852,097 for a System and Method for Capturing and Preserving Vehicle Event Data, filed Mar. 28, 2013 (Barker et al.); U.S. patent application Ser. No. 13/780,356 for a Mobile Device Having Object-Identification Interface, filed Feb. 28, 2013 (Samek et al.); U.S. patent application Ser. No. 13/780,158 for a Distraction Avoidance System, filed Feb. 28, 2013 (Sauerwein); U.S. patent application Ser. No. 13/784,933 for an Integrated Dimensioning and Weighing System, filed Mar. 5, 2013 (McCloskey et al.); U.S. patent application Ser. No. 13/785,177 for a Dimensioning System, filed Mar. 5, 2013 (McCloskey et al.); U.S. patent application Ser. No. 13/780,196 for Android Bound Service Camera Initialization, filed Feb. 28, 2013 (Todeschini et al.); U.S. patent application Ser. No. 13/792,322 for a Replaceable Connector, filed Mar. 11, 2013 (Skvoretz); U.S. patent application Ser. No. 13/780,271 for a Vehicle Computer System with Transparent Display, filed Feb. 28, 2013 (Fitch et al.); U.S. patent application Ser. No. 13/736,139 for an Electronic Device Enclosure, filed Jan. 8, 2013 (Chaney); U.S. patent application Ser. No. 13/771,508 for an Optical Redirection Adapter, filed Feb. 20, 2013 (Anderson); U.S. patent application Ser. No. 13/750,304 for Measuring Object Dimensions Using Mobile Computer, filed Jan. 25, 2013; U.S. patent application Ser. No. 13/471,973 for Terminals and Methods for Dimensioning Objects, filed May 15, 2012; U.S. patent application Ser. No. 13/895,846 for a Method of Programming a Symbol Reading System, filed Apr. 10, 2013 (Corcoran); U.S. patent application Ser. No. 13/867,386 for a Point of Sale (POS) Based Checkout System Supporting a Customer-Transparent Two-Factor Authentication Process During Product Checkout Operations, filed Apr. 22, 2013 (Cunningham et al.); U.S. patent application Ser. No. 13/888,884 for an Indicia Reading System Employing Digital Gain Control, filed May 7, 2013 (Xian et al.); U.S. patent application Ser. No. 13/895,616 for a Laser Scanning Code Symbol Reading System Employing Multi-Channel Scan Data Signal Processing with Synchronized Digital Gain Control (SDGC) for Full Range Scanning, filed May 16, 2013 (Xian et al.); U.S. patent application Ser. No. 13/897,512 for a Laser Scanning Code Symbol Reading System Providing Improved Control over the Length and Intensity Characteristics of a Laser Scan Line Projected Therefrom Using Laser Source Blanking Control, filed May 20, 2013 (Brady et al.); and U.S. patent application Ser. No. 13/897,634 for a Laser Scanning Code Symbol Reading System Employing Programmable Decode Time-Window Filtering, filed May 20, 2013 (Wilz, Sr. et al.).

* * *

In the specification and figures, typical embodiments of the invention have been disclosed. The present invention is not limited to such exemplary embodiments. Unless otherwise noted, specific terms have been used in a generic and descriptive sense and not for purposes of limitation.

The invention claimed is:

1. A system for providing a continuous communication link with a symbol reading device, comprising:
a symbol reading device having a controller module;
a communications module in communication with said controller module of said symbol reading device;
a host device in communication with said communications module via a first wired or wireless connection to a first interface of said communications module to provide a first continuous communication link between the symbol reading device and the host device; and
a server computer in communication with said communications module via a second wired or wireless connection to a second interface of said communications module to provide a second continuous communication link between the symbol reading device and the server computer that is separate from the first continuous communication link, the second continuous communication link configured to enable updating of firmware of the symbol reading device without interruption of the first continuous communication link;
wherein said communications module is integral with said symbol reading device.

2. The system of claim 1, wherein said second interface comprises a wireless personal area network interface.

3. The system of claim 1, wherein said second interface comprises a wireless local area network interface.

4. The system of claim 1, wherein said second interface comprises a wireless wide area network interface.

5. The system of claim 1, wherein communications between said controller module and said first interface are transmitted in parallel to communications between said controller module and said second interface.

6. The system of claim 1, wherein said first interface and said second interface are in shared communication with said controller module.

7. A system for providing a continuous communication link with a symbol reading device, comprising:
a symbol reading device for reading barcode symbols, said symbol reading device having a controller module;
a communications module in communication with said controller module of said symbol reading device;

a host device in communication with said communications module via a first wired or wireless connection; and a server computer in communication with said communications module via a second wired or wireless connection;

wherein said communications module is integral with said symbol reading device; and wherein said communications module comprises a first interface for the symbol reading device to communicate via a first continuous communication link with said host device and a second interface for the symbol reading device to communicate via a second continuous communication link with said server computer.

8. The system of claim 7, wherein said second interface comprises a wireless personal area network interface.

9. The system of claim 7, wherein said second interface comprises a wireless local area network interface.

10. The system of claim 7, wherein said second interface comprises a wireless wide area network interface.

11. A symbol reading device, comprising:
a controller module for converting a symbol into data;
a communications module for transmitting the data generated by said controller module, wherein said communications module is integral with said symbol reading device;
wherein said communications module comprises a first interface for the symbol reading device to communicate via a first continuous communication link with a host device via a first wired or wireless connection and a second interface for the symbol reading device to communicate with a second continuous communication link with a server computer via a second wired or wireless connection, the second continuous communication link configured to enable updating of firmware of the symbol reading device without interruption of the first continuous communication link.

12. The symbol reading device of claim 11, wherein said second interface comprises a wireless personal area network interface.

13. The symbol reading device of claim 11, wherein said second interface comprises a wireless local area network interface.

14. The symbol reading device of claim 11, wherein said second interface comprises a wireless wide area network interface.

15. The symbol reading device of claim 11, wherein said first interface comprises an RS-232 serial interface.

16. The symbol reading device of claim 11, wherein said first interface comprises a universal serial bus interface.

17. The symbol reading device of claim 11, wherein said first interface comprises an RS-232 serial interface and said second interface comprises a wireless personal area network interface.

18. The symbol reading device of claim 11, wherein said first interface comprises an RS-232 serial interface and said second interface comprises a wireless local area network interface.

* * * * *